April 3, 1945. W. B. OLDHAM ET AL 2,372,847
PEANUT HARVESTING MACHINE
Filed Aug. 5, 1943 3 Sheets-Sheet 1
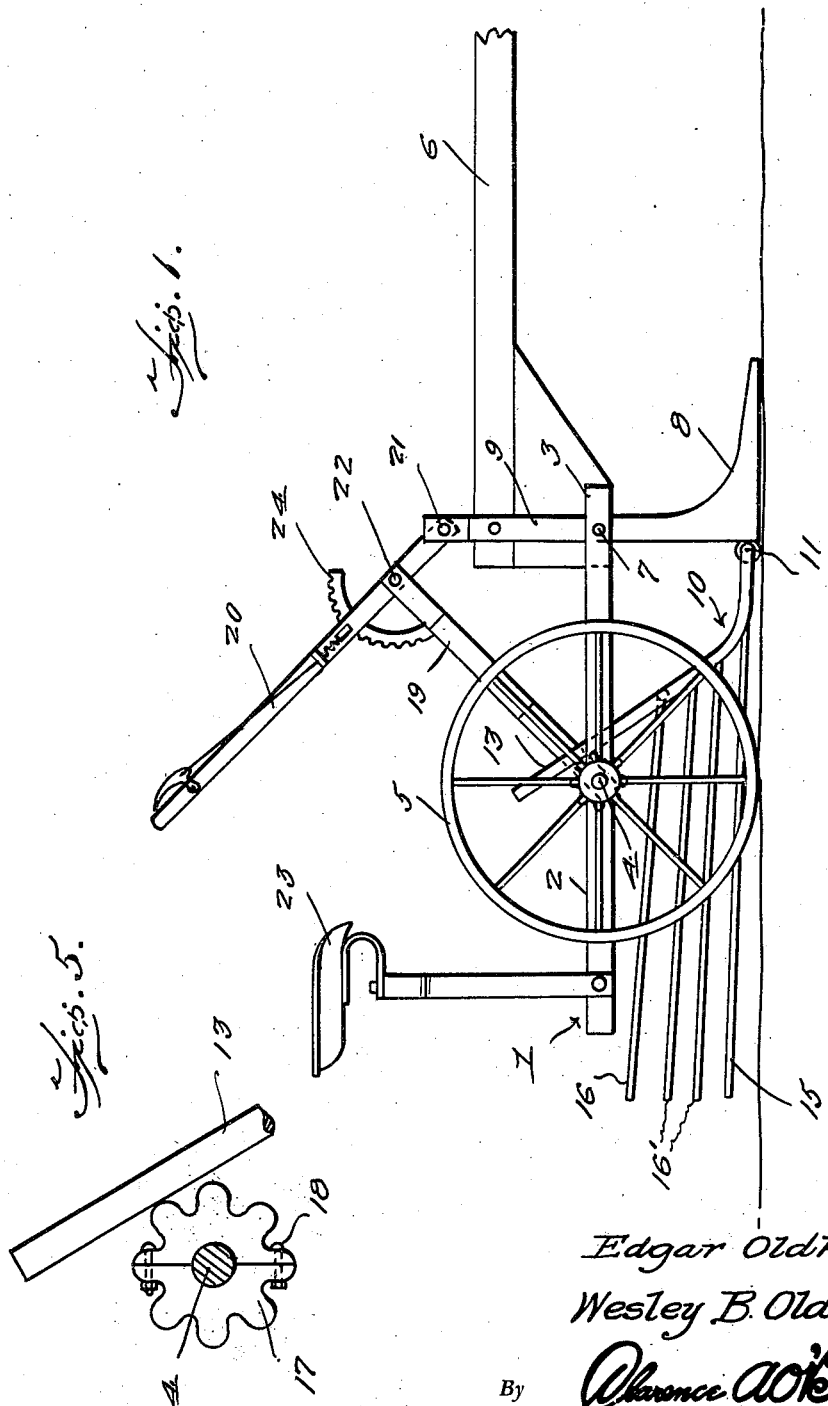
Inventor
Edgar Oldham
Wesley B. Oldham
By Clarence A. O'Brien
and Harvey B. Jacobson
Attorneys

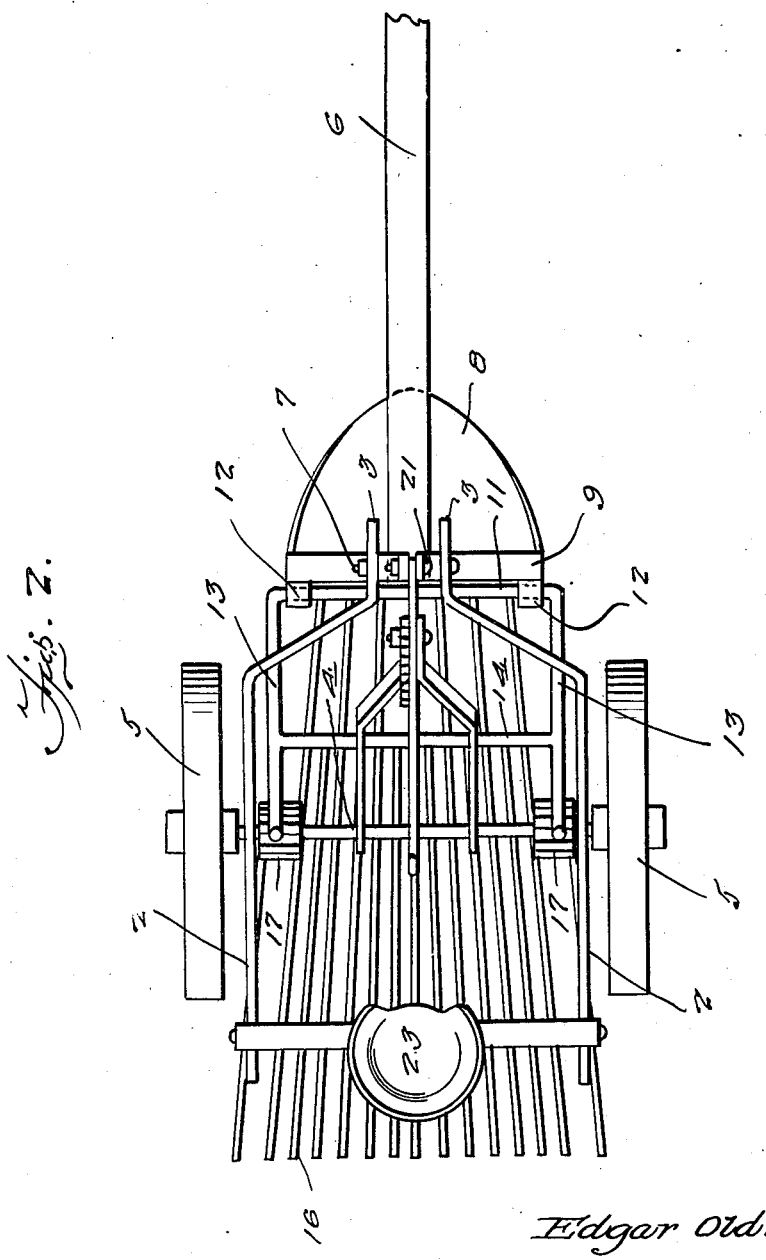

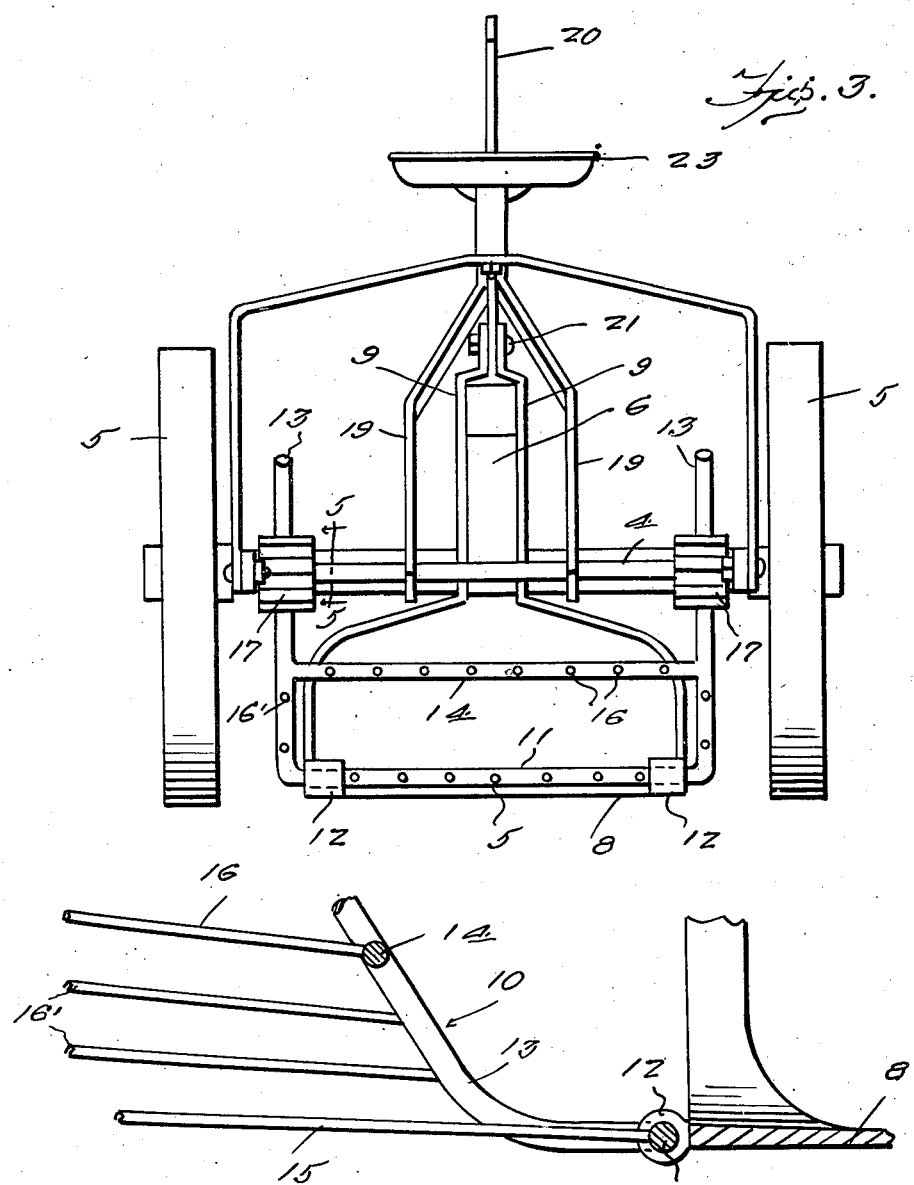

UNITED STATES PATENT OFFICE 2,372,847

PEANUT HARVESTING MACHINE

Wesley B. Oldham and Edgar Oldham, Duncan, Okla.; said Wesley B. Oldham assignor of one-third of the whole right to Gilbert H. Bond, Duncan, Okla.

Application August 5, 1943, Serial No. 497,488

1 Claim. (Cl. 55—144)

Our invention relates to improvements in peanut harvesting machines, the principal object in view being to provide a simply constructed, efficient machine adapted to be drawn along rows of peanuts to dig up and separate the same from the dirt lifted therewith, and to deposit the peanuts on the ground in a row for subsequent gathering.

Other and subordinate objects are also comprehended by our invention, all of which, together with the precise nature of our improvements, will be readily understood when the succeeding description and claims are read with reference to the drawings accompanying and forming part of this specification.

In said drawings:

Figure 1 is a view in side elevation of our improved peanut harvesting machine, in its preferred embodiment, Figure 2 is a view in top plan, Figure 3 is a view in rear elevation drawn to an enlarged scale, Figure 4 is a fragmentary view in longitudinal section through the digger and the shaker unit and drawn to an enlarged scale, and Figure 5 is a view in transverse section taken on the line 5—5 of Figure 3, and drawn to an enlarged scale.

Referring to the drawings by numerals, our improved machine, as illustrated therein, comprises a frame 1 having side bars 2 and spaced-apart front ends 3. An axle 4 is journaled in the side bars 2, substantially midway thereof, and provided with a pair of ground wheels 5 on the ends thereof, one fast thereon to impart rotation to the axle. A draft tongue 6 has its rear end interposed between the front ends 3 of the frame 2. A transverse pivot pin 7 extends through the front ends 3 of the frame 1 and through the rear end of the tongue 6, whereby said frame 1 is tiltable upwardly and downwardly, at its front end, on the axle 4 and relative to the tongue 6.

A yoke-like digger is provided at the front end of the frame 1 comprising a substantially flat bottomed, pointed shovel 8 adapted to dig beneath the ground under a row of peanuts to lift the same out of the ground, and a pair of upright side arms 9 swingably mounted below their upper ends on said pin 7, in straddling relation to the tongue 6, all for a purpose presently seen.

A trailing shaker unit 10 is mounted on the rear end of the shovel 8 for vertical vibratory movement. The unit 10 comprises a front rock shaft 11 extending across the rear end of said shovel and rotatably mounted in bearing lugs 12 on said shovel, a pair of side arms 13 inclining rearwardly and upwardly from the shaft 11 in front of the axle 4 adjacent to the side bars 2 and adapted to be vibrated to rock said shaft, and a cross-rod 14 connecting the side arms 13 at a higher level than the shaft 11 and adapted to be vibrated by said arms. Further, said unit 10 includes shaker rods 15 extending rearwardly from the rock shaft 11 side by side for vertical vibration by rocking of said shaft and forming the bottom of the unit, similar rods 16 extending rearwardly from the cross-rod 14 for vertical vibration thereby and forming a top for the unit, and vertically spaced side rods 16' extending from the side arms 13 for vertical vibration thereby and forming sides for said unit.

Toothed tappet wheels 17 are fixed on the axle 4 for engagement with the side arms 13 to vibrate the same and hence rock the shaft 11 and vibrate the cross rod 14. The tappet wheels 17 are preferably made in halves bolted together, as at 18, for attachment to the axle 4.

A pair of yoke arms 19 incline upwardly and forwardly from the axle 4 and are vertically swingable on said axle. A hand lever 20 extends rearwardly from the upper ends of the side arms 9 which are extended above the tongue 6 with the front end of said lever pivoted, as at 21, therebetween. The hand lever 20 is pivoted, as at 22, between the upper front ends of the yoke arms 19 to provide a short lever arm between the pivots 21 and 22, the arrangement being such that under operation of the hand lever in opposite directions, the frame 1 may be tilted upwardly and downwardly, respectively, to lift or lower the shovel 8 so that the latter can be entered in the ground or raised out of the same. As will be clear, the shaker unit 10 at its front end will be lifted or lowered with the shovel 8.

The usual operator's seat 23 is provided on the rear of the frame 1. Any suitable detent means, such as shown at 24, may be provided for locking the hand lever 20 in different set positions.

The operation of our invention will be readily understood. With the shovel 8 lowered into the ground, as the machine is pulled forwardly, said shovel will dig the peanuts out of the ground and discharge the same rearwardly into the described shaker unit 10 the shaker bars 15, 16, 16' of which, together with the arms 13 and cross rod 14 will be vibrated vertically as a result of operation of the tappet wheels 17 against the side arms 13 of the shaker unit. Such vibration of the shaker unit will separate the dirt and peanuts and the heavier dirt will fall through the shaker unit onto the ground. The peanuts in the shaker unit, thus cleaned, will be shaken out of the rear end of said unit onto the ground in a row to be gathered later.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What we claim is:

In a machine of the class described, a wheel-supported axle rotatable by one of the wheels, a frame mounted on said axle, a draft tongue on the frame, a digger depending from the frame in front of the axle and comprising a shovel, a shaker unit in the rear of the shovel comprising a lower front rock shaft mounted on the rear of said shovel for rocking movement, a pair of side arms inclining upwardly and rearwardly from opposite ends of said rock shaft and adapted to be vibrated vertically to rock said shaft, a cross rod extending between said arms above said shaft, shaker rods extending rearwardly from said shaft for vertical vibration by rocking of said shaft, other shaker rods extending from said side arms and cross rods for vertical vibration by said arms and cross rod, said shaker rods forming the bottom, sides and top of said unit, and a pair of toothed tappets fast on said axle, said side arms extending over said tappets and engaging the same for vibration by the tappets to rock said shaft.

WESLEY B. OLDHAM.
EDGAR OLDHAM.